(12) United States Patent
Graziosi et al.

(10) Patent No.: US 7,137,245 B2
(45) Date of Patent: Nov. 21, 2006

(54) HIGH AREA-RATIO INTER-TURBINE DUCT WITH INLET BLOWING

(75) Inventors: Paolo Graziosi, Clifton Park, NY (US); Kevin Richard Kirtley, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 146 days.

(21) Appl. No.: 10/870,884

(22) Filed: Jun. 18, 2004

(65) Prior Publication Data

US 2005/0279100 A1    Dec. 22, 2005

(51) Int. Cl.
*F02C 7/00* (2006.01)
*F02C 9/18* (2006.01)

(52) U.S. Cl. .............. 60/262; 60/39.162; 60/39.5; 415/143; 415/144

(58) Field of Classification Search .......... 60/264, 60/226.3, 806, 39.5, 262; 415/143, 144
See application file for complete search history.

(56) References Cited

U.S. PATENT DOCUMENTS

| | | | | |
|---|---|---|---|---|
| 2,703,477 A | * | 3/1955 | Anxionnaz | 60/262 |
| 2,738,645 A | * | 3/1956 | Destival | 60/262 |
| 4,214,851 A | | 7/1980 | Tuley et al. | |
| 4,448,019 A | * | 5/1984 | Klees | 60/262 |
| 5,016,436 A | * | 5/1991 | Belcher et al. | 60/264 |
| 5,632,142 A | * | 5/1997 | Surette | 60/39.5 |
| 6,973,771 B1 | * | 12/2005 | Nottin | 60/39.5 |
| 2004/0079084 A1 | | 4/2004 | Kirtley et al. | |

FOREIGN PATENT DOCUMENTS

JP    58013105    1/1983

OTHER PUBLICATIONS

"Flow Control Opportunities in Gas Turbine Engines", by W.K. Lord et al, Conference Proceedings, American Institute of Aeronautics and Astronautics, Jun. 19-22, 2000/Denver, CO, pp. 1-15.
EP Search Report, EP 05 25 3724, Sep. 13, 2005.

* cited by examiner

*Primary Examiner*—Ted Kim
(74) *Attorney, Agent, or Firm*—Richard A. DeCristofaro; Patrick K. Patnode

(57) ABSTRACT

A bypass channel for use in an inter-turbine transition duct of a gas turbine engine is connected to a suction port disposed upstream of a high-pressure turbine and an injection port disposed downstream of the high-pressure turbine. The flow through the bypass channel is motivated by the natural pressure difference across the high-pressure turbine. The flow out of the injection nozzle is used to energize the boundary layer flow downstream of the high-pressure turbine in order to allow for the use of a more aggressively expanded inter-turbine duct without boundary layer separation.

38 Claims, 1 Drawing Sheet

HIGH AREA-RATIO INTER-TURBINE DUCT WITH INLET BLOWING

TECHNICAL FIELD

The present disclosure is related to the field of gas turbine engines. More specifically, it is related to flow control in gas turbine engines.

BACKGROUND

In gas turbine engines, there is a preferred ratio between the diameters of the high-pressure turbine spool and the low-pressure turbine spool. Specifically, the low-pressure turbine spool has a larger diameter than the high-pressure turbine spool to provide optimal engine performance. Because of this difference in radial size, the transition duct joining the high-pressure and low-pressure turbines must accommodate this change in radius.

However, increasing the size of the duct over a relatively short distance can result in boundary layer separation of the flow within the duct, adversely affecting low-pressure turbine performance. Therefore, gas turbine engines are often designed with elongated transition ducts, or transition ducts that do not achieve the optimal ratio between the high-pressure turbine size and the low-pressure turbine size.

Therefore, there is a need for continued improvement in the design of such inter-turbine transition ducts.

BRIEF SUMMARY OF THE DISCLSOURE

In one embodiment of the system described herein, a duct assembly for use in a gas turbine engine is created. The duct includes an upstream portion and a downstream portion and has an inner-body surface and an outer-body surface. The duct forms a primary fluid flow path between a high-pressure turbine disposed within the upstream end of the duct and a low-pressure turbine disposed within the downstream end of the duct. A port is also included and is disposed upstream of the high-pressure turbine on the outer-body surface of the duct, and a nozzle is disposed downstream of the high-pressure turbine and is coupled to the duct. A channel having an upstream end and a downstream end connects the port and nozzle. The upstream end of the channel is coupled in fluid communication with the port and the downstream end of the channel is coupled in fluid communication with the nozzle. This channel forms a bypass fluid flow path between the port and the nozzle.

In another embodiment, a bypass duct having a suction port, a nozzle and a channel is described. The suction port is disposed on a surface of a primary flow path through a gas turbine engine upstream of a first turbine located in the primary flow path. The nozzle is located on a surface of the primary flow path downstream of the first turbine and the channel is coupled in fluid communication with both the suction port and the nozzle. The channel provides a bypass flow path that does not pass through the first turbine.

In yet another embodiment, a gas turbine engine having a duct, a high-pressure turbine, a low-pressure turbine, a suction port, a nozzle, and a bypass channel is described. The duct has an upstream end and a downstream end and also includes an inner-body surface and an outer-body surface. The duct forms a primary fluid flow path between a relatively high-pressure region associated with the upstream end of the duct, and a relatively low-pressure region associated with the downstream end of the duct. The high-pressure turbine and low-pressure turbine are disposed within the duct, the low-pressure turbine being located downstream of the high-pressure turbine. The suction port is located within the outer-body surface of the duct upstream of the high-pressure turbine, and the nozzle is disposed within the outer-body surface of the duct upstream of the low-pressure turbine. The bypass channel has an upstream end and a downstream end, with the upstream end of the bypass channel coupled with the suction port and the downstream end of the bypass channel coupled to the nozzle.

In an embodiment of a method in accordance with the description herein, a technique for optimizing the performance of a gas turbine engine is shown. The gas turbine engine has a primary fluid flow through a duct of the engine, and the duct includes a high-pressure turbine and a low-pressure turbine. A predetermined portion of the primary fluid flow is diverted into a bypass channel, and then transmitted to a nozzle disposed between the high-pressure turbine and the low-pressure turbine of the gas turbine engine. The predetermined portion of the primary fluid flow is expelled from the nozzle into the flow through the duct.

BRIEF DESCRIPTION OF THE DRAWINGS

The above mentioned and other features will now be described with reference to the drawings of an embodiment of the inter-turbine duct. The drawings are intended to illustrate, but not to limit the invention. The drawings contain the following figures.

DETAILED DESCRIPTION

Figure 1:
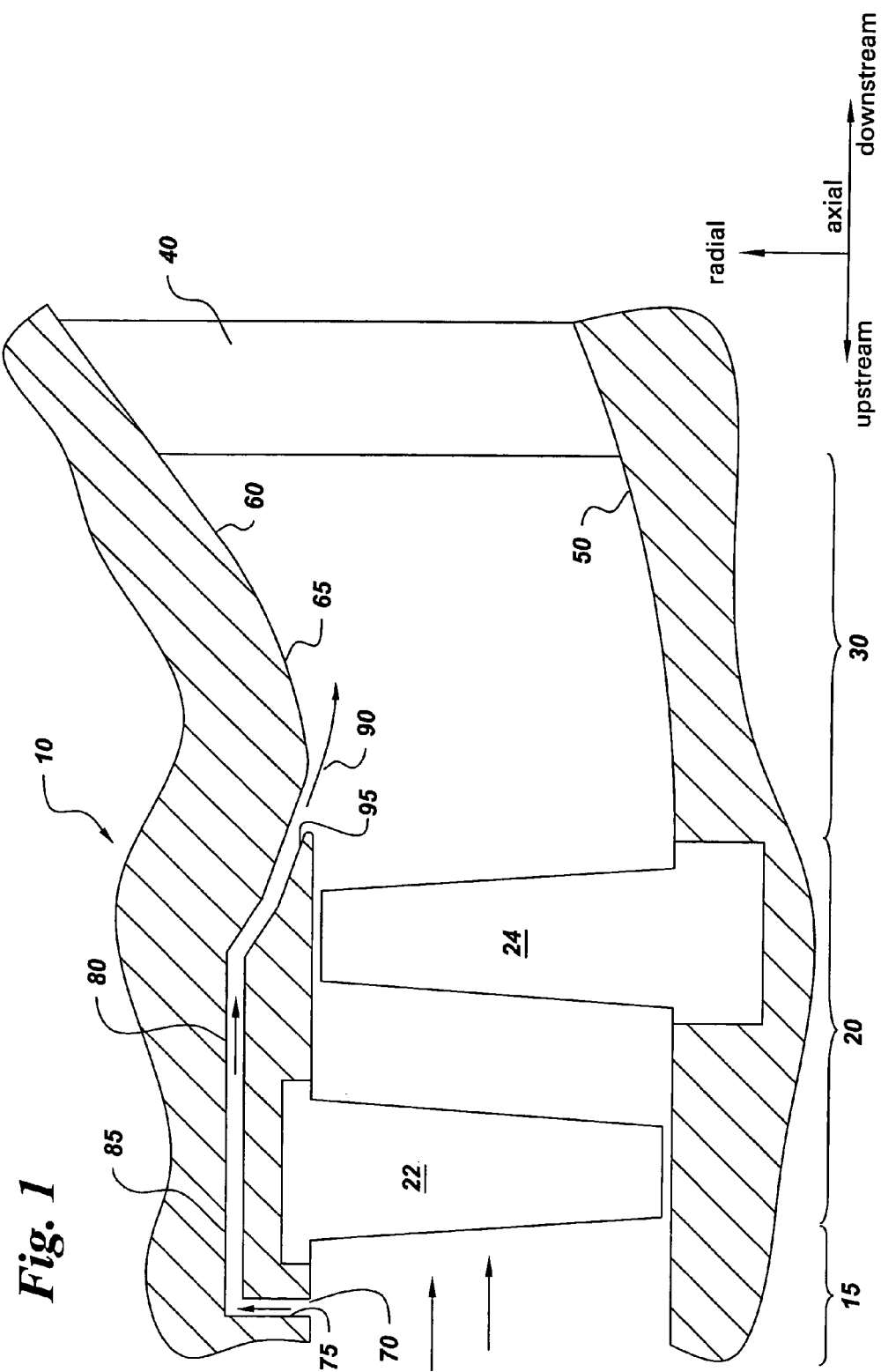
FIG. 1 is a schematic cross section of an embodiment of the inter-turbine transition duct in accordance with the present disclosure.

The described systems, assemblies, and methods use injection of high-energy air into the boundary layer of the flow through the inter-turbine transition duct in a gas turbine engine to forestall the onset of boundary layer separation along the outer-body surface of the duct. By energizing the boundary layer flowing over the outer-body surface of the duct, a more aggressively diverging duct can be used, allowing for the design of more compact, and also more efficient, turbines for engines. The high-energy air to be injected into the transition duct is bled from the flow along the outer-body wall upstream of the high-pressure turbine and channeled to an injection nozzle. Because the pressure is greater upstream of the high-pressure turbine than at the point of injection downstream of the high-pressure turbine, the natural pressure difference between the upstream suction port and the downstream injection nozzle will cause the flow to move through the injection channel without requiring a pump to push the fluid through the channel. In this way, the high-energy air injection is self-aspirating.

In the descriptions that follow, the term "axial" refers broadly to a direction parallel to the axis about which the rotating components of the gas turbine engine rotate. This axis runs from the front of the engine to the back of the engine. The term "radial" refers broadly to a direction that is perpendicular to the axis of rotation of the rotating components of the gas turbine engine and that points towards or away from the axis of the engine. A "circumferential" direction at a given point is a direction that is normal to the local radial direction and normal to the axial direction as well.

An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

A gas turbine engine operates by compressing a flow of air entering the engine, adding fuel to the compressed airflow, burning the fuel/air mixture in a combustor, and then expanding the flow from the combustor through one or more turbines. Such turbine engines may be used to provide thrust via the expulsion of the exhaust gases, to provide mechanical power by rotating a shaft connected to one of the turbines, or to provide a combination of thrust and mechanical power. For instance, the compressor on the upstream side of the engine is generally powered by a shaft driven by one or more of the turbine stages of the engine.

As the fuel/air mixture is burned in the combustor of a gas turbine engine, its temperature is increased and the flow exits the rear of the combustor at a high temperature. The combusted primary flow then passes into a duct assembly that includes the turbine stages of the engine.

An exemplary duct assembly 10 is illustrated in FIG. 1 (also referred to herein as simply "duct 10"). The cross section is taken along the axis of the gas turbine engine, with the axial and radial directions indicated in the Figure, and the upstream direction being to the left. The exhaust from the combustor (not shown) enters the duct 10 via a forward passage 15, which forms the upstream entrance to the duct assembly 10. After passing through the forward passage 15, the primary flow through the duct 10 passes through a high-pressure turbine 20. The high-pressure turbine 20 can include at least one turbine stator 22 and at least one turbine rotor 24.

The primary flow then passes through an inter-turbine transition region, or transition duct 30 of the duct assembly 10 before reaching the first nozzle of a low-pressure turbine 40. As can be seen, the exemplary duct assembly includes an inner-body surface 50 and an outer-body surface 60, representing an inner and outer surface of the duct assembly 10, with respect to the axis of the engine. These surfaces extend through the forward passage 15, the high-pressure turbine 20, the transition duct 30, and the low-pressure turbine 40.

As described above, there is a preferred ratio between the radial sizes of the high-pressure turbine 20 and the low-pressure turbine 40. It is generally desirable for the low-pressure turbine 40 to have a larger radial size in order to optimize the area ratios of the high-pressure turbine and low-pressure turbine and to enhance the performance of the gas turbine engine. The low-pressure turbine 40 may also be disposed at a greater radial distance from the axis of the engine than the high-pressure turbine 20. Designs that accommodate these factors have a transition duct 30 in which the slope of the outer-body surface 60 with respect to the axis of the engine is relatively steep. Such a steeply angled transition duct 30 results in a greater adverse pressure gradient along the outer-body surface 60 of the transition duct 30.

In a transition duct 30 with a strong adverse pressure gradient, the boundary layer flow along the outer-body surface 60 of the duct may separate, resulting in a loss of energy in the flow, and degraded performance of the engine. Therefore, the transition duct 30 may be designed with a smaller slope and/or a greater length, in order to achieve a favorable area-ratio without causing separation of the boundary layer flow in the transition duct 30. So transition ducts 30 are often used that do not achieve the optimal ratio at all.

When the slope of the outer-body surface of the transition duct 30 is sufficiently steep, the adverse pressure gradient causes boundary layer separation in the transition duct 30 at a boundary layer separation point 65. In a conventional prior art design, this separation was often avoided by lengthening the transition duct 30 or, for a fixed duct length, by reducing the radial displacement of the low-pressure turbine 40 and accepting the weight penalties and non-optimum ratios which would result. For example, one particular prior art transition duct might have a length of approximately twice the rotor height and a slope of about 31 degrees.

In order to achieve better engine performance using a shorter length transition duct 30, it is desirable to find a way to keep the boundary layer flow through the transition duct 30 attached to the more steeply angled outer-body surface 60 of a more aggressively diverging duct 30. To maintain the attachment of the boundary layer to the outer-body surface, high-energy air can be injected into the boundary layer flow in the transition duct 30 upstream of the point of boundary layer flow separation from the outer-body surface 60. In an exemplary embodiment of such a system, such as that illustrated in FIG. 1, air flowing through the forward passage 15 near the outer-body surface 60 upstream of the high-pressure turbine 20 may be bled through a suction port 70 into a bypass channel 80 that is connected to an injection port 90 located along the outer-body surface 60 downstream of the high-pressure turbine 20.

The natural static pressure difference between the suction and injection ports results in self-aspiration of flow through the channel 80. In effect, the pressure drop across the high-pressure turbine 20 drives the injection port flow in a self-aspirated mode. Thus, a portion of the flow adjacent to the outer-body surface 60 in the forward passage 15 is drawn into the channel 80 and expelled out of the injection nozzle 90. This fluid flow injection into the boundary layer of the flow in the transition duct 30 helps in preventing boundary layer separation in the transition duct 30 and allows for the manufacture and use of a transition duct 30 that has a relatively steep slope to its outer-body surface 60 when compared with existing designs. This, in turn, allows a relatively axially short transition duct 30 to be used and an optimal area-ratio to be achieved. This allows designers to minimize weight and optimize engine performance in a way not possible when separation is the limiting factor governing design of the transition duct 30. For example, one system using such a bypass channel may have a transition duct 30 with a length of about twice the high-pressure turbine rotor height and a slope of about 40 degrees.

In the exemplary illustrated embodiment of a design making use of boundary layer separation suppression as described above, the self-aspirating high-area-ratio duct 10 includes a channel operable for diverting a predetermined portion of the primary fluid flow from the forward passage 15 around the high-pressure turbine 20 and delivering it to the upstream portion of the transition duct 30. This predetermined portion of the primary fluid flow is referred to herein as the bypass flow. Specifically, the channel 80 includes a first portion 75 extending radially outward from the forward passage 15. The first portion 75 of the channel is coupled to a suction port 70 disposed on the outer-body surface 60 within the forward passage 15. The channel 80 also includes a second portion 85 aligned generally parallel to the outer-body surface 60 of the duct 10 and in fluid communication with the first portion 75. The channel 80 further includes a third portion 95 coupled to the second portion 85 and extending radially inward toward and onto the outer-body surface 60 within the transition duct 30. A nozzle 90 is coupled to the third portion 95 of the channel.

As discussed above, the suction port 70 (also referred to as the extraction port 70) is used to draw a portion of the flow through the forward passage 15 of the duct 10 into the channel 80 and bypass the high-pressure turbine 20. The bypass flow is extracted along the outer-body surface 60 in the forward passage 15 upstream of the high-pressure turbine stator 22.

Because the flow entering the forward passage 15 is coming from the combustor, this flow is hot and moving at a high speed. In many designs, this flow is hot enough to damage the materials forming the structure of the engine. To prevent such damage, cooler air is generally injected along the outer wall of the combustor to cool the surface of the combustor and insulate the combustor and forward passage from the heat of the combustion products.

The suction port 70 is desirably configured to draw mainly from this cooler air in the forward passage 15, rather than drawing from the hot core exhaust flow from the combustor. The temperature of the core exhaust flow is likely to exceed the material limitations of the materials from which the channel 80 is constructed. Although it is possible to use active cooling techniques to protect the materials of the channel from such temperatures, these techniques add complexity and cost to an engine design, and can be avoided by drawing the typically cooler air near the surface instead.

By placing the suction port 70 upstream of the high-pressure turbine 20, the cool flow adjacent to the surface of the forward passage 15 is extracted and diverted into the channel 80 before it has an opportunity to effectively mix with the hot core exhaust flow from the combustor. Once in the turbine, the hotter core flow will mix with the cooler flow near the outer-body surface 60. As a result, the cooler air available near the walls of the forward passage 15 will be mixed into the hot core flow and the air available downstream of the high-pressure turbine 20 will be hotter than the flow near the surface of the forward passage 15.

The extraction port 70 allows a portion of the flow along the outer-body surface 60 of the transition duct 30 to be drawn into the channel 80 by the existing pressure difference across the high-pressure turbine. In one embodiment, a suitable design for the extraction port 70 is a slot in the outer-body surface 60. In various embodiments, a plurality of slots, each extending around a portion of the circumference of the forward passage 15 can be used. In another embodiment, a single continuous annular slot can be used. In other embodiments, the slots can be disposed at more than one axial position along the forward passage 15. In yet another embodiment, the slots can also be formed in other shapes than annular segments, such as holes, 'V'-shapes, recessed scoops (such as NACA ducts), and such other shapes as are known in the art.

In another embodiment, a portion of the outer-body surface 60 of the forward passage 15 can be constructed using a porous material that allows flow to bleed through the porous material into the first portion 75 of the channel 80. As with the slots described above, such porous regions may be shaped as one or more annular segments, completely or partially circumscribing an axial portion of the forward passage 15. In other embodiments, other shapes for the porous material, such as holes, 'V'-shapes, NACA duct shapes, or such other designs as are known in the art can be used in place of annular segments.

In another embodiment, the suction port 70 can include one or more scoops or scoop-like shapes that extend into the forward passage 15 to physically turn a portion of the axial flow in the forward passage 15 into a radial flow into the first portion 75 of the channel 80. Such scoops may be used in addition to, or in place of slots or regions of porous material along the outer-body surface 60 of the forward passage 15. When used in place of slots or porous material, such scoops are disposed at the end of the first passage 75 such that the scoop forms the entrance to the first passage. In addition to allowing the flow to simply blow into the channel 80 under its own pressure, a scoop also allows part of the dynamic pressure of the flow to be captured and used to motivate the flow through the channel 80.

The flow along the length of the channel 80 is motivated by the difference in pressure between the upstream end of the first portion 75 of the channel 80, i.e., the suction port 70, and the downstream end of the third portion 95 of the channel, i.e., the injection nozzle 90. Because there is a pressure drop across the high-pressure turbine 20, the pressure in the duct 10 is greater upstream of the high-pressure turbine than downstream. With the ends of the channel 80 disposed on opposite sides of the high-pressure turbine 20, this natural pressure difference allows the channel 80 to be self-aspirating, i.e., the flow through the channel 80 does not require any motivation other than the existing pressure difference across the duct 10.

At least one injection port 90 (also referred to herein as nozzle 90) is used to inject the bypass flow back into the primary flow in the transition duct 30. In order to most effectively energize the boundary layer flow along the outer-body surface 60 of the transition duct 30, the bypass flow is injected along the surface of the transition duct at a high speed. In one embodiment, this speed of the injected flow is supersonic.

The nozzle 90 can be disposed and aligned in a variety of ways in order to most effectively energize the boundary layer flow along the outer-body surface 60 of the transition duct 30. Some examples of the parameters that characterize the injection nozzles are the yaw angle (the angle in the circumferential direction) and the pitch angle (the angle in the radial direction) at which the nozzle is disposed relative to the tangent plane to the outer-body surface, the size of the nozzle opening, and the shape and configuration of the nozzle or nozzles.

In one embodiment, an annular segment can be used as the geometry of the nozzle exit. Such annular segments can be formed as a single continuous exit, or as a number of discrete slots around the circumference of the transition duct 30. In other embodiments, separate discrete holes of varying sizes and shapes can be used for the openings at the end of the nozzle 90. For example, the openings can be circular, oval, or other shapes as are known in the art.

In one embodiment, the direction of the injected flow could be collinear or parallel to the outer-body surface 60. Such an arrangement can be effective when using a step slot injection that exploits the Coanda effect. By using surface that flows smoothly from the end of the nozzle 90 to the outer-body surface 60 on the downstream side of the nozzle, the flow will tend to have a pressure distribution with a minimum at the outer-body surface 60. This helps the injected jet to remain attached to the outer-body surface 60 and flow parallel to this surface and enter the overall flow through the transition duct 30 with a flow that is collinearly to the primary flow through the duct 30. It is also possible to arrange the nozzles 90 such that they inject the flow at a small diverging pitch angle relative to the local outer-body surface 60. Such an angle is less than 30 degrees in one embodiment. This arrangement may be especially effective when the nozzle exits are machined along a smooth contour of the outer-body surface.

As mentioned above, it is the pressure difference across the high-pressure turbine 20 that drives the flow through the channel 80. The pressure upstream of the high-pressure turbine can typically be about 4 times the pressure downstream of the high-pressure turbine. The pressure drop is usually sufficient to provide for supersonic flow at the exit of the nozzle 90, even taking into account losses due to the piping and geometry of the extraction port 70, channel 80, and injection nozzle 90. In order to fully take advantage of the momentum and energy of the flow through the channel 80, a converging-diverging design for the nozzle 90 can be used in one embodiment to provide fully expanded supersonic flow with minimal shock wave losses.

The cross-sectional area of the nozzle 90 can be varied along its length to control the speed of the flow through the nozzle. A converging-diverging design is one in which the cross-section area of the nozzle is reduced along its length to a minimum size at a throat in the nozzle and then increased again downstream of the throat. In another embodiment, a purely converging nozzle is used to inject the flow through the channel 80 back into the primary flow through the transition duct 30. For large pressure differences across the high-pressure turbine, using a converging-diverging injection nozzle minimizes losses due to shock waves and conserves more flow momentum as compared to a simple converging nozzle in which the flow would choke at the exit.

The use of a converging-diverging supersonic nozzle in an under-expanded configuration can have a gain of up to 40% in injected momentum compared to the correspondingly choked converging-only nozzle. Such an under-expanded configuration of the nozzle also allows the nozzle to be stable in response to slight variations in the pressure across the channel 80.

In alternate embodiments, various techniques can be used to help minimize the pressure fluctuations across the length of the channel 80 and stabilize the flow through the injection nozzle 90. For example, in one embodiment, a plenum can be included along the length of the channel 80 to provide a volume that can act as a buffer to smooth the pressure variations that may propagate along the channel during the operation of the gas turbine engine.

By injecting high speed flow along the outer-body surface 60 of the transition duct 30, the boundary layer flow through the transition duct is energized and becomes better able to negotiate the steep outer wall turn and follow the outer-body surface 60 of the transition duct 30 without separating. In testing, it was found that a 3.5% momentum ratio was required to fully eliminate separation in a transition duct that had a 20% higher area ratio than a comparable conventional design. The total pressure losses through the transition duct were similar to the total pressure losses measured in the baseline conventional duct design.

To inhibit separation of the boundary layer along the outer-body surface 60, it is desirable to energize the boundary layer flow prior to the point of expected separation 65. Therefore, in one embodiment, the nozzle 90 is disposed upstream of the point 65 where separation is expected to occur in the absence of boundary layer control. In another embodiment, the nozzle can be located at the point of expected separation 65. As it will be understood that the exact point of separation may vary with the operating condition of the gas turbine engine, it may be desirable to dispose the injection nozzle 90 at a point slightly upstream of the most upstream of the expected separation points corresponding to the expected operating conditions of the engine.

By designing a gas turbine engine to include such a self-aspirating duct that injects high-energy air into the outer-wall boundary layer and inhibits separation of the boundary layer in the flow through the turbine duct 30, several advantages may be realized in the operation and design of the engine. One such benefit is a reduction in engine specific fuel consumption because of increased efficiency of the low-pressure turbine 40. Because the outer radius of the low-pressure turbine is greater than for a conventional design, the work extracted by the low-pressure turbine rotors can be more efficiently distributed along the blade span. As a result the overall efficiency of the low-pressure turbine increases.

Another benefit is that relative to conventional designs, for a fixed area ratio and radial displacement, the transition duct 30 is shorter. This avoids the penalties in weight, parasite drag, and support hardware associated with a transition duct 30 of greater length. Such a self-aspirating channel 80 that bypasses the high-pressure turbine 20 is also advantageous over other fluidic schemes to energize the transition duct boundary layer in that the elements are relatively simple and are all disposed in the same area (i.e., near the high-pressure turbine) yielding a compact, low complexity technique for improving the efficiency of the engine.

The relatively compact nature of the flow control scheme and its related extraction and injection ports also make possible retrofitting of such a bypass to existing engines and engine designs with a minimum of additional complexity. In general, the techniques described above can be applied either during the design of a new engine to take advantage of the shorter transition duct 30 length and optimized area-ratio made possible by the boundary layer control, or to retrofit an existing engine or engine design in order to improve the efficiency of the engine while changing the design as little as possible. Although it will be appreciated that the most significant benefits of the described systems and techniques may be best realized in new designs, retrofitting of such a compact flow control scheme to provide boundary layer control in the transition duct may be especially beneficial in any duct design that currently suffers from boundary layer separation in the transition duct 30 during particular operating conditions. For such designs, the use of these techniques can provide operating benefits even without modifying the length or angle of the transition duct itself.

In addition to the configuration and embodiments described above, other ways of embodying the techniques and methods described herein may be used. For example, in one variation a plurality of channels may be disposed concentrically about the transition duct 30, the plurality of channels 80 using a common suction port 70 or, alternatively, a plurality of separate, discrete suction ports and a common nozzle 90, or alternatively, a plurality of separate, discrete nozzles. Optionally, the self-aspirating high-area-ratio transition duct assembly may also include a manifold or plenum (not shown) operable for distributing suction force to each of the plurality of suction ports 70, in the event that a plurality of suction ports is used.

In another alternative embodiment, the self-aspirating high-area-ratio transition duct may include an annular channel instead of the discrete channel 80 described above. The annular channel includes a first disc portion extending radially-outward from the forward passage 15. The first disc portion of the annular channel can be coupled to an annular suction port or a plurality of ports 70, such as a slot, a scoop, or a porous plate, disposed within the upstream end of the outer-body surface 60 of the forward passage 15. Optionally, the annular suction port may include a porous filter-like element disposed within and about a portion of the outer-body surface 60 of the forward passage 15. The annular channel also includes a second cylindrical portion aligned substantially parallel to and in a concentric relationship with the outer-body surface 60 of the duct 10. The annular channel further includes a third disc portion extending radially-inward toward and into the transition duct 30. An exhaust nozzle, or a plurality of nozzles 90, is coupled to the third disc portion of the annular channel.

Other variations can include embodiments that make use of a single suction port 70 and a single nozzle 90 connected by a plurality of individual connecting channels. Another variation includes an embodiment where a plurality of extraction ports 70 are connected to a plurality of injection nozzles 90 through a single cylindrical connecting channel second portion 85. In another embodiment, a plenum could be disposed along the length of the second portion 85 of the channel 80, allowing one plenum to mitigate pressure fluctuations across all of the extraction and injection ports and stabilize the flow through the injection ports 90 into the boundary layer flow along the outer wall surface 60.

In another embodiment a valve system, or another active or passive system, can be disposed within the channel to control the availability of the bypass flow within the channel 80 or the volume of the flow through the channel 80. In such an embodiment the channel 80 could be used to provide boundary layer control when desired and switched off to eliminate any losses from the flow when the engine was operating under circumstances where such boundary layer blowing was not desired or necessary. In a further embodiment, a valve that controlled the mass flow through the channel 80 could be used to optimize the operation of the boundary layer blowing to extract only the required amount of flow to sufficiently control separation in the transition duct. In this way, the minimum amount of mass flow is lost from the primary flow through the high-pressure turbine during operation of the engine.

In a further embodiment, the described principles may be used to practice a method for optimizing the performance of a gas turbine engine by optimizing the ratio between the diameter of the high-pressure turbine spool and the diameter of the associated low-pressure turbine spool and/or optimizing the length of the gas turbine engine. This includes diverting a portion of the primary fluid flow through the duct 10 of the gas turbine engine into a channel 80. Preferably, this bypass fluid flow is taken from the flow along the outer wall of the forward passage 15. The bypass fluid flow is injected into the transition duct 30 to a point upstream of where boundary layer separation is anticipated to occur in the transition duct 30. The injected flow is expelled into the transition duct 30 through a nozzle 90. In one embodiment this may be a converging-diverging nozzle as described above.

It will also be appreciated by those of skill in the art that the described design is not limited to aircraft engines, but rather any gas turbine engine in which it is desired to optimize the area-ratio and diameter ratio of the turbine transition duct 30 without compromising the compactness of the engine design. Such exemplary embodiments can include without limitation, power plants for ground vehicles such as locomotives or tanks, power-generation systems, or auxiliary power units on aircraft.

The various embodiments of bypass channel for a gas turbine engine duct described above thus provide a way to achieve more optimal area ratios and diameter ratios between the high-pressure and low-pressure turbines without lengthening the transition duct between the turbines to an extent that causes degradation of performance. These techniques and systems also allow a gas turbine engine designer to design a transition duct that achieves a more optimal area ratio and diameter ratio without having to suffer the performance losses associated with separation of the boundary layer flow in the transition duct encountered when using a more axially compact design.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a scoop in conjunction with the suction port described with respect to one embodiment can be adapted for use with the annular channel described with respect to another. Similarly, the various features described, as well as other known equivalents for each feature, can be mixed and matched by one of ordinary skill in this art to construct duct assemblies in accordance with principles of this disclosure.

Although the systems herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

What is claimed is:

1. A duct assembly for use in a gas turbine engine, the duct assembly comprising:
    a duct having an upstream portion and a downstream portion, wherein the duct comprises an inner-body surface and an outer-body surface, and wherein the duct forms a primary fluid flow path between a high-pressure turbine disposed within the upstream end of the duct and a low-pressure turbine disposed within the downstream end of the duct;
    a combustor coupled to the upstream portion of the duct, the duct being configured to receive the flow from the combustor;
    a port disposed upstream of the high-pressure turbine on the outer-body surface of the duct;
    a nozzle disposed downstream of the high-pressure turbine and coupled to the duct; and
    a channel having an upstream end and a downstream end, wherein the upstream end of the channel is coupled in fluid communication with the port and the downstream end of the channel is coupled in fluid communication with the nozzle, and wherein the channel forms a bypass fluid flow path between the port and the nozzle.

2. A duct assembly as in claim 1 wherein the nozzle is disposed upstream of the low-pressure turbine.

3. A duct assembly as in claim 1 wherein the nozzle is disposed upstream of a separation point in the boundary layer fluid flow along the outer-body surface of the duct downstream of the high-pressure turbine.

4. A duct assembly as in claim 1 wherein the bypass fluid flow path does not pass through the high-pressure turbine.

5. A duct assembly as in claim 1 wherein the nozzle is a converging-diverging nozzle.

6. A duct assembly as in claim 1 wherein the nozzle is a converging nozzle.

7. A duct assembly as in claim 1 wherein the speed of the flow out of the nozzle is supersonic.

8. A duct assembly as in claim 1 wherein the channel further comprises a plenum.

9. A duct assembly as in claim 1 wherein the port comprises an opening in the outer-body surface.

10. A duct assembly as in claim 1 wherein the channel comprises a tube.

11. A duct assembly as in claim 1 wherein the channel comprises an annular structure.

12. A duct assembly as in claim 11 wherein the port comprises a plurality of openings in the outer-body surface of the duct, each of the plurality of openings being in fluid communication with the channel.

13. A duct assembly as in claim 11 wherein the nozzle comprises a plurality of openings in the outer-body surface of the duct, each of the plurality of openings being in fluid communication with the channel.

14. A duct assembly as in claim 1 wherein the port is disposed adjacent to a fluid flow boundary layer present within the primary fluid flow path adjacent to the outer-body surface of the duct.

15. A duct assembly as in claim 1 wherein the nozzle is disposed adjacent to a fluid flow boundary layer present within the primary fluid flow path adjacent to the outer-body surface of the duct.

16. A duct assembly as in claim 15 wherein the nozzle is disposed upstream of a fluid flow boundary layer separation point present within the duct along the outer-body surface of the duct.

17. A duct assembly as in claim 1 wherein a first fluid pressure associated with the primary fluid flow through the duct at the port is greater than a second fluid pressure associated with the primary fluid flow through the duct at the nozzle.

18. A duct assembly as in claim 17 wherein the difference between the first fluid pressure and the second fluid pressure causes fluid to flow through the bypass fluid flow path from the port to the nozzle.

19. A duct assembly as in claim 1 wherein a portion of the flow through the primary fluid flow path is diverted into the channel by the port.

20. A duct assembly as in claim 1 wherein the port comprises a plurality of openings in the outer-body surface.

21. A duct assembly as in claim 20 wherein each of the plurality of openings are coupled in fluid communication with the channel.

22. A duct assembly as in claim 1 wherein the port comprises an annular slot in the outer-body surface.

23. A duct assembly as in claim 22 wherein the annular slot partially circumscribes the duct.

24. A duct assembly as in claim 1 wherein the nozzle comprises an annular opening in the outer-body surface.

25. A duct assembly as in claim 24 wherein the annular opening partially circumscribes the duct.

26. A duct assembly as in claim 1 wherein the nozzle comprises a plurality of openings in the outer-body surface.

27. A duct assembly as in claim 26 wherein the plurality of openings in the outer-body surface are in fluid communication with the channel.

28. A duct assembly as in claim 1 wherein the nozzle comprises a curved surface that is tangent to the outer-body surface of the duct in the downstream direction from the nozzle.

29. A duct assembly as in claim 28 wherein the curved surface is configured such that the pressure in the flow out of the nozzle is at a minimum at the outer-body surface on the downstream side of the nozzle.

30. A bypass duct comprising:
a suction port disposed on a surface of a primary flow path through a gas turbine engine, the port disposed upstream of a first turbine located in the primary flow path and located downstream of a combustor of the gas turbine engine;
a nozzle disposed on a surface of the primary flow path downstream of the first turbine; and
a channel coupled in fluid communication with both the suction port and the nozzle,
wherein the channel provides a bypass flow path that does not pass through the first turbine.

31. A bypass duct as in claim 30 wherein the nozzle is disposed upstream of a second turbine of the gas turbine engine.

32. A bypass duct as in claim 30 wherein the nozzle is disposed upstream of a fluid flow boundary layer separation point present within the primary flow path along the surface of the primary flow path downstream of the first turbine.

33. A bypass duct as in claim 30 wherein the nozzle is a converging-diverging nozzle.

34. A bypass duct as in claim 30 wherein the speed of the flow out of the nozzle of the bypass duct is supersonic.

35. A bypass duct as in claim 30 wherein a first fluid pressure associated with the primary fluid flow through the duct at the suction port is greater than a second fluid pressure associated with the primary fluid flow through the duct at the nozzle.

36. A bypass duct as in claim 35 wherein the difference between the first fluid pressure and the second fluid pressure causes fluid to flow through the bypass duct from the port to the nozzle.

37. A bypass duct as in claim 30 wherein a portion of the flow through the primary fluid flow path is diverted into the bypass duct by the port.

38. A gas turbine engine comprising:
a duct having an upstream end and a downstream end and comprising an inner-body surface and an outer-body surface, the duct forming a primary fluid flow path between a relatively high-pressure region associated with the upstream end of the duct, and a relatively low-pressure region associated with the downstream end of the duct;
a combustor coupled to the upstream end of the duct, the duct being configured to receive the flow from the combustor;
a high-pressure turbine disposed within the duct;
a low-pressure turbine disposed within the duct downstream of the high-pressure turbine;
a suction port disposed within the outer-body surface of the duct upstream of the high-pressure turbine;
a nozzle disposed within the outer-body surface of the duct upstream of the low-pressure turbine; and
a bypass channel having an upstream end and a downstream end, wherein the upstream end of the bypass channel is coupled with the suction port and the downstream end of the bypass channel is coupled to the nozzle.

* * * * *